United States Patent
Park et al.

(10) Patent No.: US 6,372,381 B1
(45) Date of Patent: Apr. 16, 2002

(54) DUPLEX-COATED CATHODE CANS, AND ELECTROCHEMICAL CELLS MADE THEREWITH

(75) Inventors: SangKeun Park, Portage; John Claude Springstead, Mazomanie; David Matthew Armour, Fitchburg, all of WI (US)

(73) Assignee: Rayovac Corporation, Madison, WI (US)

( * ) Notice: Subject to any disclaimer, the term of this patent is extended or adjusted under 35 U.S.C. 154(b) by 0 days.

(21) Appl. No.: 09/349,304

(22) Filed: Jul. 7, 1999

Related U.S. Application Data
(60) Provisional application No. 60/118,953, filed on Feb. 5, 1999.

(51) Int. Cl.$^7$ .......................... H01M 2/04; H01M 4/00; H01M 6/00
(52) U.S. Cl. .................. 429/176; 429/27; 29/623.1; 428/679
(58) Field of Search ............................ 429/176, 27, 82; 428/679; 148/143; 29/623.1

(56) References Cited

U.S. PATENT DOCUMENTS

| | | | | |
|---|---|---|---|---|
| 3,795,494 A | * | 3/1974 | Hordon | 29/196.6 |
| 3,837,894 A | * | 9/1974 | Tucker, Jr. | 117/70 A |
| 3,909,209 A | * | 9/1975 | Kruper et al. | 29/183.5 |
| 4,013,488 A | * | 3/1977 | Ramqvist et al. | 148/143 |
| 4,188,459 A | * | 2/1980 | Hyner et al. | 428/648 |
| 4,198,442 A | * | 4/1980 | Gupta et al. | 427/34 |
| 4,358,922 A | | 11/1982 | Feldstein | 57/401 |
| 4,364,800 A | * | 12/1982 | Partridge | 204/15 |
| 4,411,961 A | * | 10/1983 | Tremmel | 428/613 |
| 4,418,125 A | * | 11/1983 | Henricks | 428/639 |

(List continued on next page.)

Primary Examiner—Tom Dunn
Assistant Examiner—L. Edmondson
(74) Attorney, Agent, or Firm—Quarles & Brady LLP (57) ABSTRACT

Improved cathode cans, for use in electrochemical cells. Broadly, the cans comprise corrosion-susceptible core layers, and protective metal layers such as nickel overlying the core layer and disposed between the core layer and a, preferably electroless plated, duplex coating layer such as nickel, which overlies severed edges of the core layer, and also typically overlies the protective metal layers. Thickness of the duplex coating layer is less, preferably no more than 75%, of the thickness of the protective metal layer. Combined thickness of the protective metal layer and duplex coating layer is preferably about 75 microinches (0.002 mm) to 200 microinches (0.005 mm). Thickness of the duplex coating layer alone is preferably about 25 microinches (0.0006 mm) to 100 microinches (0.0025 mm). Combined thickness of the protective metal layer and the duplex coating layer is preferably at least 1.25 times, up to no more than 2 times, thickness of the protective metal layer. The invention comprehends methods of making duplex coated cans, including fabricating a can body from pre-plated metal sheet, and post-coating the entire can body, including exposed unplated areas of the core layer, to make a duplex-coated can having first and second coating layers on a large portion of the surface of the can. The invention comprehends fabricating first and second cell populations comprising cathode cans having susceptible metal edges, and respectively not having susceptible metal edges, as sequential products on a cell assembly line, using duplex coated cans for fabricating cells less susceptible to corrosion. The invention also comprehends switching an electrochemical cell assembly line between first and second sequential products without significant machine set-up, wherein the first product comprises a cell having an exposed metal edge readily susceptible to corrosion, and the second product comprises a cell not having a corresponding exposed metal edge readily susceptible to corrosion.

91 Claims, 3 Drawing Sheets

U.S. PATENT DOCUMENTS

| | | | |
|---|---|---|---|
| 4,457,450 A | | 7/1984 | Smith et al. .................. 220/455 |
| 4,940,639 A | * | 7/1990 | Ohshima et al. ............. 428/659 |
| 5,209,957 A | | 5/1993 | Lin ............................ 428/34.7 |
| 5,397,658 A | * | 3/1995 | Dunham ..................... 429/129 |
| 5,567,538 A | * | 10/1996 | Oltman et al. ................. 429/27 |
| 5,576,113 A | * | 11/1996 | Hirofumi et al. ............ 428/679 |
| 5,587,248 A | * | 12/1996 | Ohmura et al. .............. 428/610 |
| 5,650,246 A | * | 7/1997 | Dopp et al. .................. 429/233 |
| 5,658,356 A | * | 8/1997 | Burns ......................... 29/623.2 |
| 5,662,717 A | * | 9/1997 | Burns ......................... 29/623.1 |
| 6,040,074 A | * | 3/2000 | Adey et al. ..................... 429/27 |
| 6,051,327 A | * | 4/2000 | Serafin et al. ............... 428/652 |
| 6,060,196 A | * | 5/2000 | Gordon et al. ............... 429/229 |
| 6,197,445 B1 | * | 3/2001 | Ward et al. .................. 429/163 |
| 6,205,831 B1 | * | 3/2001 | Adey et al. ..................... 72/47 |
| 6,245,452 B1 | * | 6/2001 | Oltman ......................... 429/27 |

* cited by examiner

DUPLEX-COATED CATHODE CANS, AND ELECTROCHEMICAL CELLS MADE THEREWITH

CROSS-REFERENCE TO RELATED APPLICATIONS

This application claims priority to Provisional Application Serial No. 60/118,953 filed Feb. 5, 1999.

FIELD OF THE INVENTION

This invention relates to air depolarized alkaline electrochemical cells. Typically, such cells have metal-containing anode materials, and air cathodes, and are commonly known as metal-air cells. More particularly, this invention relates to the composition and structure of cathode cans utilized in such cells, and in general to the cells, themselves. The invention addresses especially the tendency of cathode cans of air depolarized cells to corrode in high humidity environments. The invention particularly addresses structures and methods for attenuating susceptibility of such cans to corrode at edges of the cans which are cut during can fabrication, exposing a corrosion-susceptible interior layer of the metal sheet material from which such cans are fabricated. The invention specifically addresses improvements in can-making technology which facilitate changeover between assembling cells of pre-plated cans bearing no post-coating protection and cells wherein the cans bear a post-coated protective coating at edges of the cans cut during dimensional fabrication of the cans, including fabrication of air ports when the cans are to be used in air depolarized cells.

BACKGROUND

As used herein, "post-plated" cans and "post-coated" cans refer to any can which is subjected to a plating or other metal-coating process after dimensional fabrication of the can has been substantially completed.

As used herein, a "pre-plated" can refers to a metal coating which is applied before dimensional fabrication of the can is substantially completed, including all methods of applying such layers, such as electroplating, electroless plating, and cladding.

As used herein, "unplated" and "uncoated" metal sheet or can refers to material which is not coated or plated with nickel or another corrosion-inhibiting metal before dimensional fabrication of the can has been substantially completed, and which material is subsequently coated onto the metal sheet after fabrication of the can has been substantially completed.

As used herein, a "fully coated" can refers to a can having no uncoated, corrosion-susceptible layers, although coating thickness can be different at different locations on a given can.

As used herein, unless otherwise specifically stated, the term "outer surface" as referring to metal strip or a cathode can made therefrom, means all surfaces of the sheet or can which are exposed to an environment external to the respective sheet or can.

Growth in use of small and very small electrically-powered devices has fueled corresponding growth in demand for small and very small metal-air electrochemical cells. Such cells are known, for example, by the size designations "PR41," "PR44, "PR48," and "PR70," as well as size "5." Metal-air cells have gained significant popularity because only the anode reaction material need be packaged as an electroactive chemical in the cell. The corresponding cathode reaction material is oxygen, which is drawn from the surrounding ambient environment.

Such small and very small cells are usually disc-like or pellet-like in appearance, and are about the sizes of garment buttons. These cells generally have diameters ranging from less than 6 millimeters to about 25 millimeters, and heights ranging from about 2.0 millimeters or less up to about 15 millimeters.

Such metal-air cells take in atmospheric oxygen, and convert the oxygen to hydroxyl ions in the air cathode by interaction with aqueous alkaline electrolyte. The hydroxyl ions then migrate to the anode, where they cause the metal contained in the anode to oxidize. Usually the active anode material in such cells comprises zinc, although a variety of other operable anode materials are well known to those skilled in the art.

More particularly, the desired reaction in the air cathode of a metal-air cell involves the reduction of oxygen, the consumption of electrons, and the production of hydroxyl ions. The hydroxyl ions migrate through the aqueous alkaline electrolyte toward the anode, where oxidation occurs, forming zinc oxide.

In typical metal-air cells, air enters the cell through one or more air ports in the bottom the cathode can. The port or ports extend through the bottom wall of the cathode can, and may be disposed immediately adjacent the cathode assembly, or may preferably be separated from the cathode assembly by an air reservoir, which is typically occupied at least in part by an air diffusion member.

In such arrangements, the air port facilitates movement of air through the bottom wall of the cathode can and to the cathode assembly. At the cathode assembly, oxygen in the air reacts with water in the electrolyte as a chemically reactive participant in the electrochemical reaction of the cell, and thereby forms the hydroxyl ions.

Typical cathode cans used in air depolarized cells are fabricated from metal sheet having a core layer of steel, and layers of nickel on opposing sides of the steel core layer. Can fabrication comprises a series of punching, pressing, and/or otherwise dimensionally forming steps, including punching out the air ports, and cutting the cans from a continuous strip of the metal sheet. In the process, the core steel layer is exposed at severed edges of the so-created air ports and at severed edges formed when the cans are separated from the continuous strip of metal sheet.

This invention focuses on apparatus, methods, and materials for providing improved cathode cans, including providing improved protection of severed edges from corrosion while generally maintaining the dimensional can specifications which are related to pre-plated cans not having the severed edge protection.

One can to select from a variety of known materials for use in making e.g. pre-plated or post-plated cathode cans. The respective different materials may have different dimensional specifications, different chemical compositions, or different chemical or physical properties, or any combination of these.

Changing material selection affects the ability to fabricate the can, or the method by which the cathode can is fabricated, and the corresponding ability of the can to support fabrication and use of the cell. Thus, starting from a given set of metal strip specifications, where thicker or thinner, or harder or softer, metal sheet, or metal strip having different layer structuring, is contemplated for use to form cathode cans, there is the prospect that the actual structures and properties of cans resulting from dimensional and structural fabrication of such metal sheet, and absent changes in the can fabrication process, will be dependent in part on the specifications of the metal sheet from which the cans are fabricated.

Accordingly, using known pre-plated cans as a reference, any change in selection of material from which the cans are to be made, or change in physical dimensions of such material, or changes in set-up of machines or other equipment for can fabrication, must be balanced against the fabrication characteristics associated with such material and set-up as the material is used to fabricate the respective cans; as well as the characteristics associated with fabrication and use of a cell utilizing such cans.

Any change of material must, of course, be compatible with the chemical environment within which the cell operates. Typically, air depolarized cells operate in an alkaline environment, and so any material used in such cells must be compatible with such environment to the extent such material is exposed to the alkaline environment. Similarly, where the cells are to be used in high humidity climates, any material exposed to the ambient environment should have a suitably high degree of resistance to being corroded by water vapor during the contemplated use lives of the cans and respective cells.

Air depolarized cells are used in the full range of inhabited climates. The cathode cans of typical air depolarized cells are made using metal sheet comprising a core layer of steel, coated on opposing sides with respective first and second layers of nickel.

Fabrication of cathode cans for use in air depolarized cells typically begins with a more-or-less endless coil of metal sheet. The metal sheet is punched, pressed, and otherwise dimensionally worked and formed for size and shape. In the process, as to each can, a bottom wall, and corresponding upstanding side wall, of the can are fabricated. Such working and forming has two general effects on the metal sheet in addition to the dimensional changes. First, the metal sheet is hardened by such mechanical working of the sheet. Second, the working by the tooling, such as punches and dies, tends to reduce any uneven-ness in the surfaces of the metal sheet.

As a cathode can is fabricated, one or more air ports is formed in the bottom wall, and the can is eventually separated from the metal strip by cutting the metal sheet proximate the top edge of the side wall. The forming of the air port or ports, and the cutting of the can from the metal strip, cut through the entire thickness of the metal sheet, including through the steel core layer. As a result, the steel core layer is exposed at the so-cut and/or so-punched edges. Such edges can be fabricated by other methods. However, typical other methods also result in the steel layer being exposed at the edge.

In relatively lower humidity environments, such as in a temperate or continental climate, the exposed steel edge does not corrode during normal storage and use life of the cell, and therefore the exposed steel edge is acceptable for substantial portions of the market where typical e.g. hearing aid cells are used in lower humidity environments.

In relatively higher humidity environments, such as in tropical climates, an exposed steel edge corrodes during normal storage and use life of the cell, and therefore an exposed steel edge is not desirable for use in high humidity climates.

It is known to make cathode cans for use in air depolarized cells by dimensionally fabricating the can from unplated steel, and subsequently post-plating the entirety of, and thus all exposed surfaces of, the dimensionally-fabricated can, with nickel. By post-plating the can after dimensional fabrication, all surfaces of the can are protected by the post-plating operation, such that there are no exposed steel edges.

However, post-plated cans present a number of technical challenges. A post-plated layer, which is a plated layer which is not subsequently worked substantially, may not be as uniform in thickness, nor as uniform in distribution, as desired. Accordingly, such unworked post plated layer which is the sole means for suppressing corrosion, and thus gassing, of the steel, must be relatively thicker in order to effectively suppress the corrosion, namely thicker than an equally effective pre-plated and mechanically-worked layer. While a conventional pre-plated layer can be about 75 microinches (0.0019 mm) thick, for example because such layer has been mechanically worked to attenuate surface irregularities of the plating layer, typical thickness for a conventional post-plated layer is about 100 microinches (0.0025 mm) to about 500 microinches (0.013 mm) thick. Such thick layer carries an undesirable cost increment because of the high amount of costly nickel which is used. Given the requirement of a maximum specified overall thickness for the bottom wall and/or side wall, use of thicker layers of nickel reduces the potential thickness of the stronger steel layer, whereby the can is correspondingly weaker than a can having the same thickness side wall or bottom wall, made from pre-plated sheet metal wherein the worked plating layer or layers is/are thinner and the steel correspondingly thicker.

Further, unplated steel is inferior in dimensional fabrication characteristics, as compared to nickel plated or nickel clad metal sheet because an exposed nickel layer assists in lubricating the metal sheet during dimensional fabrication of the metal sheet. A desirable result of the lubrication provided by nickel is that the cans are less susceptible to localized thinning of the metal sheet during dimensional fabrication of the cans.

Typically, cathode cans made from unplated sheet, such as unplated steel, are fabricated on a manufacturing line which is also used to make cathode cans from pre-plated metal sheet. Of the two products, pre-plated cans for low and moderate humidity environments are produced in greater volume than unplated cans which are subsequently post-plated. The unplated metal sheet is thinner than the pre-plated metal sheet, to allow for adding a post-coated coating layer of nickel or other corrosion-inhibiting metal while still maintaining an average overall thickness of the can bottom wall and side wall close to or generally equivalent to the respective thicknesses of bottom walls and side walls of cathode cans fabricated from pre-plated metal sheet on the same line of cathode can manufacturing machines.

Dimensional fabrication of such cathode cans can include, for example, applying cooperating punch and die combinations to the metal sheet, thus to form the cup-like configuration of the can and to form suitable air ports. Since the unplated metal sheet is thinner than the pre-plated metal sheet, and since the punch and die are typically set up for pre-plated metal sheet, the unplated metal sheet forms dimensionally somewhat differently than does the pre-plated metal sheet, about the punch and die combinations. The resulting so dimensionally fabricated uncoated can, post coated after dimensional fabrication, has sufficiently different dimensional characteristics from a similarly-fabricated pre-plated can as to cause a variety of difficulties at cell assembly. Such difficulties typically result in engineering costs, assembly line down-time rates, and cell reject rates, all substantially higher than corresponding costs, down-time rates, and cell reject rates associated with making cells using pre-plated cans. Such difficulties include, for example and without limitation, electrolyte leakage from the cell, uneven closing force on the seal and the cathode assembly, inward dishing of the bottom wall of the cathode can, uneven height of the cathode can side wall, the cathode can side wall being not perpendicular to the bottom wall, uneven thickness of the post-coated layer, incorrect thickness of the post-coated layer, failure of the post-coated layer to adequately control corrosion, and the like.

In addition, the unplated metal sheet does not enjoy the lubricating properties of the nickel pre-plated layer, whereby metal draw characteristics are different. For example, corner formation of unplated metal sheet may be accompanied by greater thinning of the material adjacent the corners. Yet further, without benefit of the nickel plating, the uncoated metal can exhibit coarser surface characteristics than pre-plated metal sheet, which requires a thicker nickel post-coating layer, compared to the thickness required of a pre-plated coating layer, in order that the underlying steel layer be adequately protected from corrosion.

Thus, there are clearly a number of difficulties related to making and working with post-plated cans. And there are clearly a number of advantages related to working with pre-plated metal sheet and thereby making pre-plated cans, including the higher-volume market for pre-plated cans. Accordingly, it is desirable to make and use pre-plated cans wherever possible, and to make and use post-plated cans only for use in those markets, typically lower volume markets, where post-plated cans are needed to provide corrosion resistance at cut or otherwise exposed edges.

Cells of the type contemplated herein are efficiently made on highly automated manufacturing machines. One result of a decision, such as above, to make both pre-plated and post-plated cans, and to assemble cells using both such types of cans, is that a manufacturer must develop automated machines and processes for manufacturing both lower corrosion resistance (e.g. pre-plated) cans, and higher corrosion resistance (such as post-plated) cans, as well as the automated machines and processes for assembling both cells using pre-plated cans and cells using post-plated cans.

The market for air depolarized cells which require the higher level of corrosion resistance is much smaller than the market for air depolarized cells in which the lower level of corrosion resistance is acceptable. Regarding timing, some customers demand that only "fresh" cells be delivered. Thus, a manufacturer does not have the option of making an extended production run of a slower moving e.g. post-plated product, and then drawing that product from a warehouse over a period of several months while continuously producing the higher volume product. Rather, the market demands that all product be freshly made. To meet the freshness demand, even a lower volume product must still be manufactured at frequent intervals of e.g. 30 days or less, in order that product not get "stale" before shipment and use.

Since the volume of the slow-moving product is small compared to conventionally-known production speeds, a separate manufacturing line is not justified. Rather, the manufacturing line that fabricates the higher-volume pre-plated cans, and the manufacturing line that assembles cells using the higher-volume pre-plated cans, are necessarily used for manufacturing the lower volume post-plated cans and for assembling the lower volume cells using the post-plated cans.

A typical, conventional manufacturing line can only work on one of the two products at a time, and the two products cannot be run sequentially on a typical such manufacturing line without shutting down the line and adapting the line set-up for the product which is to run next. Desirably, the set-up operations required to convert a manufacturing line from the pre-plated can to the post-plated can, or from the post-plated can to the pre-plated can, whether can fabrication or cell assembly, should be minimized. In addition, the manufacturing line should run either can equally efficiently in making product. Preferably, the can manufacturing line and/or the cell assembly line can be converted from one product to the other with little or no set-up time or other disruption in ongoing fabrication of units of product, whether cans or cells.

Efficiency of the manufacturing operation can be measured in terms of number of units (e.g. cans or cells) produced per hour, per shift, per day, or the like. Other, and at least equally significant, measures of manufacturing efficiency include the product reject rate, the amount of downtime, and any aborts of a production run for failure to solve a production problem. Abort means that manufacture of the particular product of interest (e.g. post-plated) was temporarily abandoned in favor of producing another product (e.g. pre-plated), prior to producing the desired number of units of the product of interest (e.g. post-plated), while the difficulties causing the abort of the production run (e.g. post-plated) are investigated and solved.

It is an overall object of the invention to provide improved cathode cans, and corresponding air depolarized electrochemical button cells made with such cathode cans.

It is a more specific object of the invention to provide cathode cans having improved corrosion resistance in high humidity environments, and wherein the metal sheet used to fabricate cans for use in cells to be used in high humidity environments is the same as, or very similar to, the metal sheet used to fabricate cans for use in cells to be used in lower humidity environments.

It is yet another object to provide duplex-coated cathode cans wherein a relatively thin post-coating layer is applied outwardly of a pre-plated metal coating layer.

A more specific object is to apply a duplex coating layer outwardly of a pre-plating layer, after dimensional fabrication of the cathode can.

A further object is to provide a cathode can wherein a duplex coating is applied such that the duplex coating layer, but not a protective metal pre-plate layer, covers a severed edge of a core layer of the metal sheet.

It is a yet further object to provide a cathode can wherein a duplex coating covers substantially all of the outer surface of the cathode can.

Still another object is to provide a method of fabricating a cathode can for use in air depolarized cells including, after dimensionally fabricating pre-plated metal sheet to form a cathode can body, post-plating the entirety of the dimensionally-fabricated can body, including exposed uncoated areas thereof, and including post-plating over the pre-plating layer.

Another object of the invention is to assemble air depolarized cells using duplex coated cans in combination with machinery, including machine set-up and assembly steps, used for making cells incorporating pre-plated cans which have not been duplex coated.

Yet another object is to produce electrochemical cells on a manufacturing line employing pre-plated cans having exposed severed edges of the can core layer, and to convert the production operation to cells employing fully plated cans without making substantial changes to set-up of the assembly apparatus on the assembly line, while maintaining substantially the same, or similar, down-time and reject rates associated with pre-plated cans.

SUMMARY

The invention, in general, comprehends a cathode can, for use in an air depolarized electrochemical button cell. In a broad sense, the cathode can has an outer surface including opposing inner and outer major surface elements, and comprises a substrate having a metal core layer, and protective metal plating layers as coatings on opposing sides of the core layer; and a duplex coating layer disposed outwardly of the metal plating layers. An air port extends through the bottom wall between the inner and outer major surface elements of the cathode can.

In preferred embodiments, the duplex coating layer covers a susceptible portion of the outer surface of the substrate, susceptible to being corroded in a high humidity environment, for example a surface wherein the metal has been cut through the entire thickness of the metal sheet.

In some embodiments, the core layer has an exposed edge extending to the outer surface of the substrate. The exposed edge is not protectively coated by protective metal e.g. pre-plated layers, but is coated by the duplex coating layer.

In some embodiments the duplex coating layer serves as a covering defining a majority of the outer surface of the cathode can.

In preferred embodiments, the predominant material in the duplex coating layer is the same as the predominant material in the generally underlying protective metal plating layers, and is preferably nickel.

Preferably, the thickness of the duplex coating layer is less, generally no more than 75%, of the thicknesses of the respective protective metal plating layer which is juxtaposed at a locus of interest on the duplex coating layer.

In preferred embodiments, the combined thickness of a given protective metal plating layer and the respective duplex coating layer is about 0.002 mm (75 microinches) to about 0.005 mm (200 microinches), preferably about 0.0006 mm (about 25 microinches) to about 0.0025 mm (about 100 microinches).

In preferred embodiments of the invention, the cathode can has a bottom wall, and an upstanding side wall extending up from the bottom wall, overall thickness of at least one, preferably both, of the bottom wall and the side wall being about 0.002 inch (0.05 mm) to about 0.010 inch (0.25 mm), preferably about 0.0025 inch (0.06 mm) to about 0.008 inch (0.2 mm), more preferably about 0.003 inch (0.08 mm) to about 0.0055 inch (0.140 mm).

In preferred embodiments, the thickness of a combination of the protective metal plating layer and the duplex coating layer is at least 1.25 times, optionally at least 1.5 times, but no more than 2 times, the average thickness of a respective protective metal plating layer.

Again referring to preferred embodiments, the duplex coating layer is a result of, and is deposited on the can by, an electroless plating process.

In some embodiments, the protective metal plating layer is configured, either mechanically or chemically, or both, to enhance plating receptivity of the protective metal plating layer to a subsequent coating process, thereby to enhance uniformity of the coating deposit of an overlying, e.g. duplex, coating layer.

In preferred embodiments, the predominant material in both the protective metal plating layer and the duplex coating layer is nickel, and the core layer is steel. Preferably, the protective plating layer is nickel, diffusion bonded to the steel core layer annealed, and mechanically work hardened such as squeezing between rolls at a nip.

Further to preferred embodiments, the steel core layer has an exposed edge extending to the outer surface of the substrate, and the duplex coating layer is in surface-to-surface contact with, and covering, the core layer at the exposed edge, preferably at all otherwise-exposed edges of the steel. The duplex coating layer can cover the entirety of any one or more susceptible portions of the steel layer at the outer surface of the can without intervention of the metal plating layers between the duplex coating layer and the susceptible portion at the outer surface of the can.

In typical embodiments, the duplex coating layer covers the entirety of all otherwise exposed steel edges, and the entire surfaces of the protective nickel pre-plating layers, such that the duplex coating layer forms the entirety of the outer surface of the so-coated cathode can. Correspondingly, the duplex coating layer, when deposited in the preferred range of thicknesses, substantially suppresses corrosion of the cathode can in a highly corrosive environment, during normal use life of a cell made with a respective such cathode can. Such can has a corrosion susceptibility, in a high humidity environment, substantially less than the corrosion susceptibility of a like can but without the duplex coating layer.

In a second family of embodiments, the invention comprehends a cathode can for use in an air depolarized electrochemical button cell. The cathode can comprises metal sheet material defining a severed edge portion, and a pre-plated portion defined by protective metal plating layers overlying a core layer, the core layer not being protectively coated by the protective metal plating layers at the severed edge portion of the metal sheet. The cathode can further comprises a duplex coating comprising the protective metal plating layers and a duplex coating layer. A first portion of the duplex coating comprises the duplex coating layer, but not the protective metal plating layer, covering the severed edge of the core layer, without intervention of the protective metal plating layer between the duplex coating layer and the core layer at the severed edge. A second portion of the duplex coating, away from the severed edge, comprises the protective metal plating layer being between the duplex coating layer and the core layer.

In a third family of embodiments, the invention comprehends a family of cathode cans for use in an air depolarized electrochemical button cell. A respective cathode can has an outer surface which includes opposing inner and outer major surface elements. "Inner" and "outer" refer to orientation with respect to cells made with such cans. A corrosion inhibiting duplex coating covers substantially all of the metal sheet core. The duplex coating generally comprises protective metal plating layers overlying a core layer, and an outwardly-disposed duplex coating layer overlying portions of the protective metal plating layer. A first portion of the duplex coating layer is in surface-to-surface contact with, and covers, one or more severed edges of the metal sheet core.

The invention further comprehends a method of making a cathode can for use in an air depolarized electrochemical cell. The method comprises fabricating a cathode can body from pre-plated metal sheet comprising a steel core layer between protective metal plating layers, including creating an uncoated area of the core layer, exposed to the ambient environment; and after fabricating the cathode can body, post-coating the entirety of the cathode can body, including the exposed uncoated area of the core layer, with a duplex coating material, to thereby make a duplex-coated cathode can having the protective metal coating layers underlying the duplex coating layer on a large portion of the surface of the can and the duplex coating layer but not one of the protective metal plating layers on the exposed, otherwise uncoated area of the core layer.

Another expression of the invention is in methods of fabricating first sets of air depolarized electrochemical button cells comprising cathode cans having metal edges susceptible to corrosion in high humidity environments, and second sets of electrochemical button cells comprising cathode cans not having metal edges susceptible to corrosion in high humidity environments, as sequential sets of product on a cell assembly line. A representative method comprises fabricating a first population of cathode cans from metal sheet having a core layer, pre-plated with protective metal plating layers such that the so-fabricated cans have exposed metal edges susceptible to corrosion in high humidity environments; applying a duplex coating layer of protective metal to a portion of the first population of cathode cans, thereby to create a second population of duplex-coated cans. The duplex coating layer is sufficiently thick to increase the level of corrosion resistance of the cans at the susceptible metal edges to a level above the corrosion resistance extant in cans not so duplex coated, and sufficiently thin as to accommodate routine assembly of electrochemical cells using cathode cans of the second population in the same machines, and using the same set-up, as are used to assemble cells using cans of the first population. The second population of cans is made according to machine set-up and assembly steps used for making cells incorporating cans of the first population.

The method further comprises assembling electrochemical cells using the duplex coated cans of the second population in combination with the machines and machine set-up and assembly steps used for making cells incorporating cans of the first population; and testing the electrochemical cells made with the duplex coated cans so as to establish a first population of acceptable cells having elevated levels of corrosion resistance in high humidity environments and a second population of cells having a lower level of corrosion resistance, acceptable for use in lower-humidity environments.

A still further expression of the invention is a method of switching an electrochemical cell assembly line between first and second sequential products wherein the first product comprises cells having exposed metal edges susceptible to corrosion under high humidity conditions, and the second product comprises cells not having corresponding exposed metal edges susceptible to corrosion under high humidity conditions.

The method comprises fabricating a first population of cathode cans having a first set of dimensional can specifications by performing dimensional metal fabrication steps on pre-plated metal sheet having a second set of metal sheet specifications. The pre-plated metal sheet comprises a metal core layer between first and second coating layers. The first and second coating layers define pre-plated outer surfaces of the metal sheet. The operations performed in fabricating the first population include physically exposing a portion of the core layer at one or more edges, or other portions, of the sheet, and thereby fabricating cans having exposed metal edges susceptible to corrosion under high humidity conditions.

The method further includes fabricating a second population of duplex coated cathode cans having a third set of dimensional can specifications, by post-applying second relatively thin, and protective, post-coating layers onto cans having the first set of specifications, thus post-coating both the pre-plated surfaces and the exposed metal edges. The first and second (pre-plate) layers are disposed between the core layer and the post-coating layers, but not at respective severed or otherwise exposed edges. The post-coating layers thus provide corrosion protection for the core layer at the severed or otherwise exposed metal edges.

The third set of dimensional can specifications is sufficiently similar to the first set of dimensional can specifications that both the first and second can populations can be run on a common assembly line, preferably using a common set-up.

The method still further includes fabricating a first set of cells using cans having the first set of dimensional specifications, accompanied by a fourth set of down-time ratios and reject rates, and fabricating a second set of cells using cans having the third set of dimensional specifications, without making substantial changes to set-up of assembly apparatus on the assembly line, accompanied by a fifth set of down-time ratios and reject rates similar to the fourth set of down-time ratios and reject rates.

The invention is not limited in its application to the details of construction or the arrangement of the components set forth in the following description or illustrated in the drawings. The invention is capable of other embodiments or of being practiced or carried out in other various ways. Also, it is to be understood that the terminology and phraseology employed herein is for purpose of description and illustration and should not be regarded as limiting. Like reference numerals are used to indicate like components.

DESCRIPTION OF THE ILLUSTRATED EMBODIMENTS

Figure 1:
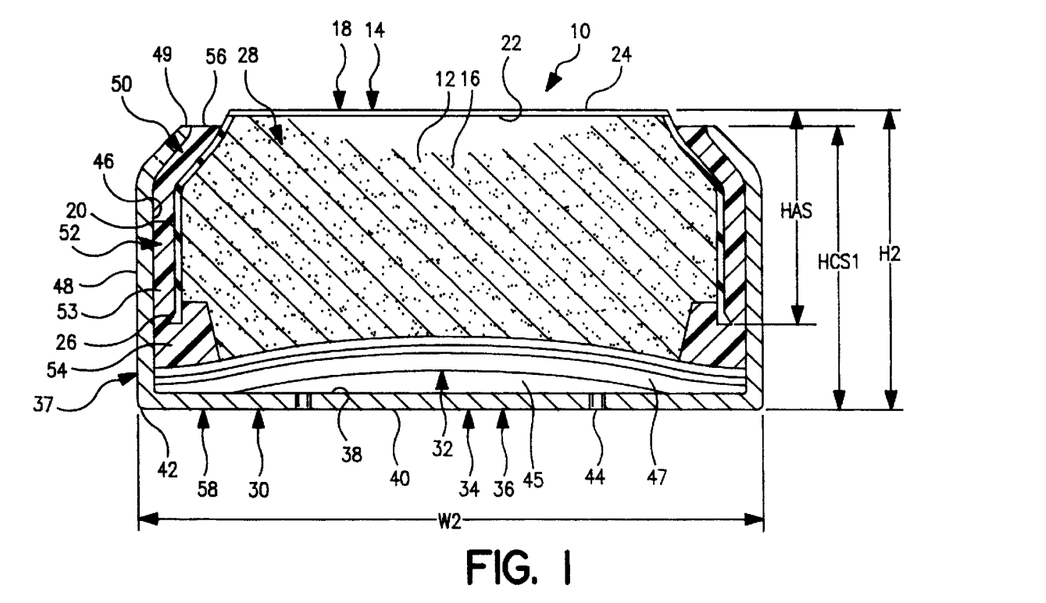
FIG. 1 is a representative showing of a typical button cell made with a duplex-plated cathode can of the invention.

Referring now by characters of reference to the drawings, and first to FIG. 1, the number 10 refers generally to an air depolarized button cell of the invention. Cell 10 includes negative electrode 12, also referred to as anode 12. Anode 12 includes an anode can 14 and electrochemically reactive anode material 16 contained generally within the anode can. Anode can 14 has a top wall 18, and circumferential downwardly-depending side wall 20. Top wall 18 and side wall 20 have, in combination, an inner surface 22 and an outer surface 24. Side wall 20 has a height "HAS," shown in FIG. 1, generally corresponding to the overall height of the anode can, and terminates in a distal edge at circumferential anode can foot 26.

Positive electrode 30, also referred to as cathode 30, includes an air cathode assembly 32, contained within cathode can 34. Cathode can 34 has a bottom wall 36, and a circumferential upstanding side wall 37 extending upwardly from the bottom wall. Bottom wall 36 has a generally flat inner surface 38, a generally flat outer surface 40, and an outer perimeter 42 defined on the flat outer surface 40.

As illustrated in FIG. 1, one or more air ports 44 extend through bottom wall 36 of the cathode can, providing avenues for transport of oxygen into the cell adjacent cathode assembly 32. In some embodiments, air reservoir 45 spaces cathode assembly 32 from bottom wall 36 and the corresponding ports 44. A porous diffusion layer 47 operates as a bottom layer of cathode assembly 32, and may fill air reservoir 45. Circumferential side wall 37 of the cathode can extends upwardly from bottom wall 36, terminates at distal edge 49, and has an inner surface 46 and an outer surface 48.

Side wall 37 of the cathode can, as shown in FIG. 1, has a height "HCS1," generally corresponding to the height of the cathode can in FIG. 1. As seen in FIG. 1, height "HAS" of anode can side wall 20 is significantly greater than half the height "HCS1" of the cathode can side wall. Outer surface 40 of bottom wall 36 preferably has a substantially flat portion extending radially outwardly to outer perimeter 42, and radially outwardly of inner surface 46 of side wall 20.

Anode 12 is electrically insulated from cathode 30 by seal material illustrated by a seal 50. Seal 50 includes a circumferential side wall 52 disposed in space 53, which side wall extends over a substantial portion of height "HAS" between upstanding side wall 37 of the cathode can and downwardly-depending side wall 20 of the anode can. A seal foot 54 is located generally between cathode assembly 12, and foot 26 of the anode can. A seal top 56 is located where side wall 52 of seal 50 ends between side walls 20 and 37 adjacent the top of the cell. In the embodiment illustrated in FIG. 1, the anode, including anode can 14 and anode material 16, is received inside the cathode can such that the entirety of cathode can side wall 37 is disposed radially outwardly of corresponding portions of anode can side wall 20. Other side wall relationships are contemplated, including where "HCS1" is substantially shorter in height than "HAS."

Outer surface 58 of cell 10 is defined by portions of the outer surface 24 of the top of the anode can, outer surface 48 of side wall 37 of the cathode can, outer surface 40 of bottom wall 36 of the cathode can, and top 56 of seal 50. The anode can and the cathode can, in combination, define a top and a bottom of the cell. Typical overall height "H2" of the cell is about 15 mm or less. Typical maximum diameter "W2" of the cell is about 25 mm or less. In some embodiments, height "H2" and/or maximum diameter "W2" can be greater than the above-recited dimensions. The ratio of the maximum height to the maximum diameter ranges from about 0.1/1 to about 1/1. As seen in FIG. 1, height "H2" and maximum diameter "W2" define a right cylinder, representing an overall volume of the cell, generally ranging between about 0.04 $cm^3$ and about 0.60 cm, including all sizes in between, typically for cells directed toward hearing aid applications, although other applications can work equally well.

Inner surfaces of anode can 14, cathode assembly 32, and seal foot 54, generally define an anode cavity 28 which contains anode material 16.

In general, this invention addresses the materials, structures, and methods which affect the degree of efficiency with which cells, having relatively higher, and relatively lower, levels of corrosion resistance in the cathode can, can be fabricated in serial batch sequence on a given set of manufacturing machines. The invention addresses materials, structures, and methods for fabricating the two types of cathode cans, as well as materials, structures, and methods for assembling cells incorporating the two types of cathode cans. Further, the invention addresses the cathode cans and cells fabricated using the above materials, structures, and methods.

At cell assembly, closing force is applied to the top and bottom of the cell being assembled. Bottom wall 36 receives a portion of the cell closing force. Such closing force pushes upwardly on the bottom wall, whereby bottom wall 36 tends to be dished upwardly, toward the interior of the cell being formed. Such upward dishing is undesirable for a number of reasons, including, without limitation, that such dishing reduces the usable volume inside the cell, potentially with corresponding reduction in total cell discharge capacity, as well as giving the impression that the cell has been damaged.

Thus, it is desirable to maintain bottom wall 36 flat, whereby the bottom wall is not dished inwardly at cell closure. The ability of the bottom wall to resist such inward dishing is related to, among other things, the thickness of the bottom wall, the material from which the bottom wall of the cathode can is fabricated, the properties of the material used in the bottom wall, the relative thicknesses of the respective layers in the bottom wall, and the angular orientation of the side wall with respect to the bottom wall.

Relatively shallower cathode cans such as those illustrated in the drawings are fabricated by forming a cup-shaped unit in a continuous strip of metal sheet. First portions of the cup-shaped unit are severed from the metal sheet, adjacent the top edge of the unit, during the fabrication process. Second portions of the cup-shaped unit remain attached to the metal sheet until the unit has been adequately formed, whereupon the cup-shaped unit is completely severed from the metal sheet.

Figure 2:
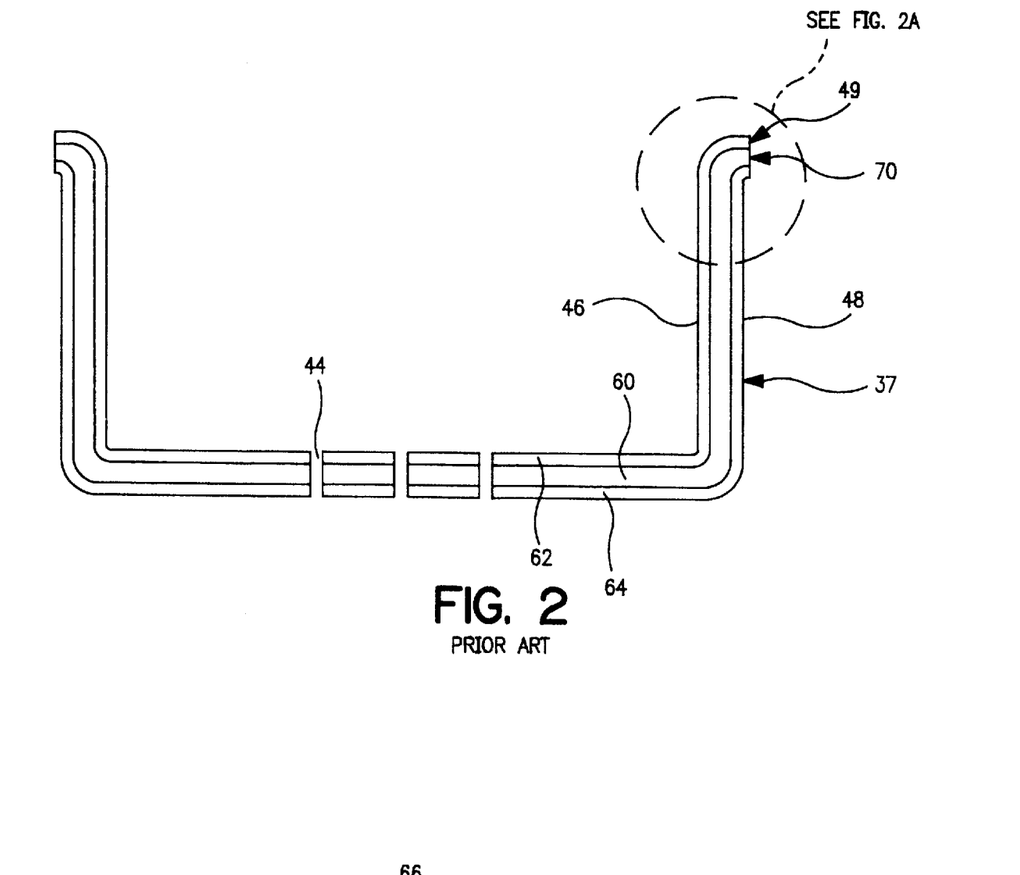
FIG. 2 shows a cross-section of a prior art pre-plated cathode can.
Figure 2A:
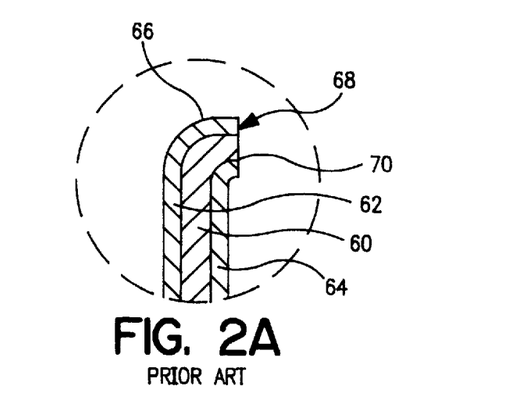
FIG. 2A is an enlarged fragmentary cross-section, taken at dashed circle 2A of FIG. 2.

FIGS. 2 and 2A illustrate prior art cathode cans made from pre-plated metal sheet. As seen therein, the severed edge of the metal sheet is turned somewhat outwardly adjacent the top edge of the side wall, where the side wall has been severed from the metal sheet.

Referring specifically to FIGS. 2 and 2A, a core layer 60 of steel, preferably but not necessarily cold rolled steel, is disposed between a first inner layer 62 of nickel and a second outer layer 64 of nickel. Inner layer 62 defines inner surface 46 of the illustrated side wall 37, and outer layer 64 defines outer surface 48 of the illustrated side wall. Upper distal edge 49 of the cathode can defines an out-turned element 66 terminating in a severed edge 68.

Whereas steel core layer 60 is in general overlaid by nickel layers 62, 64, and is in general protected by overlying nickel layers 62, 64 from direct contact with the ambient environment, as seen in FIGS. 2 and 2A, an edge 70 of steel layer 60 is exposed to the ambient environment at severed edge 68. Similar exposed steel edges are also present at the severed edges inside each of air ports 44. Such exposed small areas of steel as at severed edge 68, and air ports 44, are acceptable when the can is used in a cell which is to be used in a climate where humidity is low or moderate. However, the exposed steel at severed edge 68, and air ports 44, will corrode during a normal storage and use life of a cell which is used in a high humidity environment. Thus, the can illustrated in FIGS. 2 and 2A, having the exposed steel at severed edge 68, is unacceptable for use in a high humidity environment.

In order for a cathode can to not corrode in a high humidity environment, the can should not have any exposed steel edges. Accordingly, any steel exposed after the can has been dimensionally fabricated should be covered by a protective layer. Such protective layer can be applied by known solution coating processes, such as for example and without limitation, electroplating or electroless plating.

Figure 3:
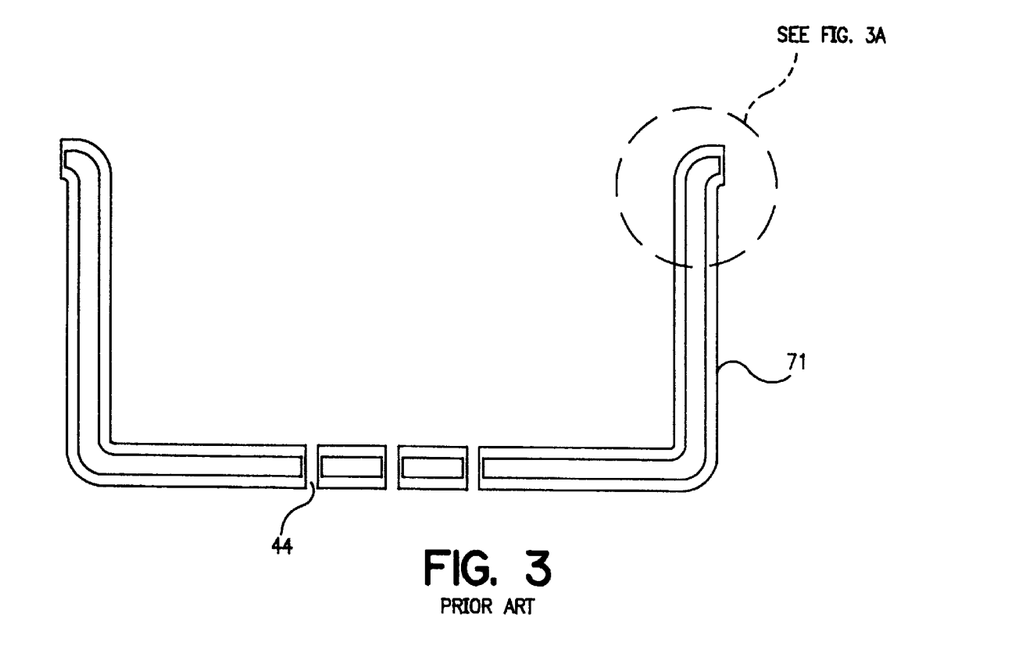
FIG. 3 shows a cross-section of a prior art post-plated cathode can.
Figure 3A:
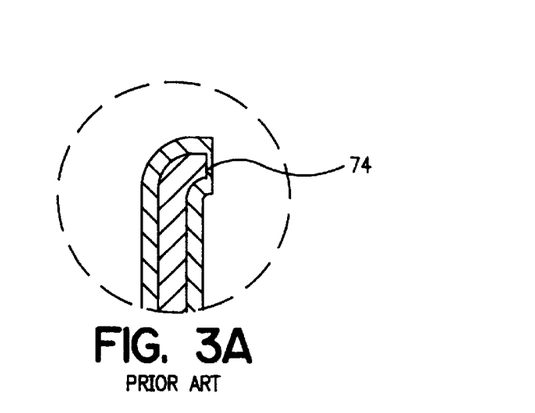
FIG. 3A is an enlarged fragmentary cross-section, taken at dashed circle 3A of FIG. 3.

The can shown in FIGS. 3 and 3A is illustrative of a typical conventional post-plated cathode can. As seen therein, the entire surface of the can is covered with a plating layer 71 such as nickel.

In general, the can of FIGS. 3 and 3A can be fabricated as follows. The starting material is a strip of single-layer metal sheet having a desired steel composition, which will be suitable for a core layer corresponding to layer 60 in the embodiment of FIGS. 2 and 2A. The metal sheet is dimensionally fabricated in a multiple stage punch and die operation to develop generally the 3-dimensional characteristics desired for the can being fabricated. In the process, air ports 44 are punched through the metal strip at the bottom of the cell.

When the 3-dimensional fabrication process is completed, the so-fabricated can is severed from the metal strip, leaving an out-turned cut steel distal edge 74 corresponding to distal edge 70 in FIGS. 2 and 2A. Further distal edges are expressed in air ports 44. However, since the can is fabricated using single-layer steel sheet, at this stage in can fabrication, all the surfaces of the can, as well as the edges of the can, are exposed to the ambient environment.

The can is then post-plated by immersing the can in a suitable, for example a conventional, solution coating bath, thereby overcoating the can with a nickel post-plating layer, which covers all exposed surfaces of the dimensionally-fabricated can. The can is, prior to plating, processed through suitable cleaning and other known preparation steps prior to the actual plating step.

Since the can has already been fabricated into a 3-dimensional structure before the post-plating step is performed, no further general mechanical working of the entirety of the coated surfaces is done, whereby the nature of the coated surface, and the dimensional characteristics of the post-plated can, are generally dependent on the nature, precision, and control of the preparation and plating process, and the characteristics of the plating layer produced thereby.

Namely, certain anomalies occurring during plating of flat metal sheet can sometimes be alleviated or eliminated by mechanical working, such as hot or cold rolling, of the sheet after the plating step. Similarly, physical properties of the plated layer can be up-graded by such subsequent processing. But such mechanical working is generally limited to flat metal sheet. Where, as here, the metal has been fabricated into a 3-dimensional work piece prior to the plating step, subsequent such general mechanical working is not an option, whereby any anomaly in the coating process, or in the coated product obtained therefrom, will likely be retained, and thus be present in the finished product. Similarly, there is no corresponding opportunity to up-grade the physical properties of the plated layer.

Referring briefly back to FIGS. 2 and 2A, nickel layers 62, 64 are part of the metal sheet at the time the metal sheet is punch-fabricated into a 3-dimensional part. In such punch-fabrication, the nickel provides a degree of lubrication to punch-forming of the metal sheet, thereby improving metal flow, attenuating metal thinning at areas of high flow, and providing for an overall more desirable 3-dimensional structure, including desirable surface characteristics, after the punch-fabrication steps.

Cans fabricated in a post-plated can fabricating process as is typically used to fabricate cans as in FIGS. 3 and 3A do not have benefit of the above-described nickel lubrication. As a result, the various benefits ascribed to the lubricating nickel, such as those described above, do not attain to steel cans fabricated as in making cans of FIGS. 3 and 3A.

For a variety of reasons, well known to those skilled in the art, the nickel layer conventionally post-plated onto the can, after dimensional fabrication of the can is completed as in FIGS. 3 and 3A, is thicker than a pre-coated layer as in FIGS. 2 and 2A. Whereas a conventional pre-coated layer 62, 64, is typically of the order of about 75 microinches (0.0019 mm) thick, a typical conventional post-plated layer is about 100 microinches (0.0025 mm) to about 500 microinches (0.013mm) thick. Thus a typical post-plated can uses more of the expensive nickel than a typical conventional pre-coated can by about 60% up to about 500% or more. Similarly, assuming a given constant overall thickness of core layer plus overlying layers, the greater thickness of the post-plated nickel layers as in FIGS. 3, 3A, requires a lesser thickness of the steel layer compared to FIGS. 2, 2A, and corresponding reduction in physical strength of the cathode can, as attributed to thickness of the steel layer.

Again for reasons well known in the art, under certain circumstances, it is highly desirable to produce both pre-plated and post-plated cans for the corresponding low humidity and high humidity cell markets. However, because volume of the slower-selling cells is so low, and in view of known cost-effective manufacturing speeds, it is not economically feasible to set up a manufacturing line devoted exclusively, or even primarily, to the slower selling product. Accordingly, the slower-moving product is desirably manufactured on the same machines that manufacture the faster-moving pre-plated product.

In order to manufacture the slower-moving product on the same manufacturing line as the faster-moving product, the specifications of the cans used in the slower-moving product should be as close as possible to the specifications of the cans used in the faster-moving product. For example, the finished dimensions of the two types of cathode cans should match each other as closely as possible. Bending and other forming characteristics of the two types of cathode cans should be as close to each other as possible. Strength characteristics of the two types of cathode cans should be as close to each other as possible. The angles between the bottom walls and the side walls on the two types of cathode cans should match each other as closely as possible.

Since the finished dimensions of the post-plated cans are to be as close as possible to the pre-plated can finished dimensions, and since the post-plated can is a single layer material when dimensionally-fabricated, the single layer material, when dimensionally fabricated, is thinner than the pre-plated material when such pre-plated material is dimensionally fabricated. Ideally, the set-up of the punch and die combinations should be modified to account for the change in metal sheet thickness. However, since the operating loci of both surfaces of the metal sheet are in different locations for making unplated cans than when using pre-plated metal sheet, and since the tolerances are measured in thousandths of an inch (more or less hundredths of a millimeter), substantial set-up can be required to prepare the machines to run the uncoated metal sheet. But since a typical run of such cans of FIGS. 3 and 3A is typically only one day up to a few days, spending substantial amounts of time getting the punch and die machines perfectly set up for making uncoated cans is not economically feasible, especially since the machines will again be re-set to run pre-plated cans after the short run of conventional uncoated cans.

In spite of reasonable efforts to set up the machines to make post-plated cans, in some instances, entire production runs, of a day of more, of cells incorporating cans made according to conventional post-plating processes, fail to pass the necessary corrosion tests for use in high humidity environments. In such circumstances, the failed cells may pass corrosion tests for use in low humidity environments and so can be shipped into appropriate such markets. However, when that happens, a further production run of post-plated cans is then again needed in order to satisfy the product needs of the higher humidity market, again disrupting the typically ongoing production run of cells using pre-plated cans.

Further, since set-up of the punch and die machines is often a trial and error process, practiced by highly skilled technicians and engineers, and in view of the short production runs of uncoated metal sheet, the actual product manufacturing time may not be long enough to get the punch and die machines fully set up, stabilized, and more or less optimized, before the desired number of uncoated cans have been produced. In such scenario, manufacturing uncoated cans involves a constant struggle to get the manufacturing operation set up, without sufficiently long run time to properly work the bugs out of the system set-up.

Yet further, since such set-up is an art and not an exact science, disruption of the set-up already in place for pre-plated cans tends to cause a corresponding trial and error difficulty in re-establishing the pre-plate set-up when pre-plated cans are again to be run.

Thus, the combination production line which produces both pre-plated cans and uncoated cans presents a predictable disruption and distraction whenever the manufacturing line is switched from pre-plated cans to uncoated cans, and from uncoated cans to pre-plated cans. The manufacturing operation is accordingly highly disrupted and distracted at each such changeover. While low and intermediate levels of production may benefit from producing only uncoated cans which are subsequently post plated, where high levels of production are contemplated, the many advantages associated with pre-plated cans suggest that pre-plated cans be used whenever possible.

Figure 4:
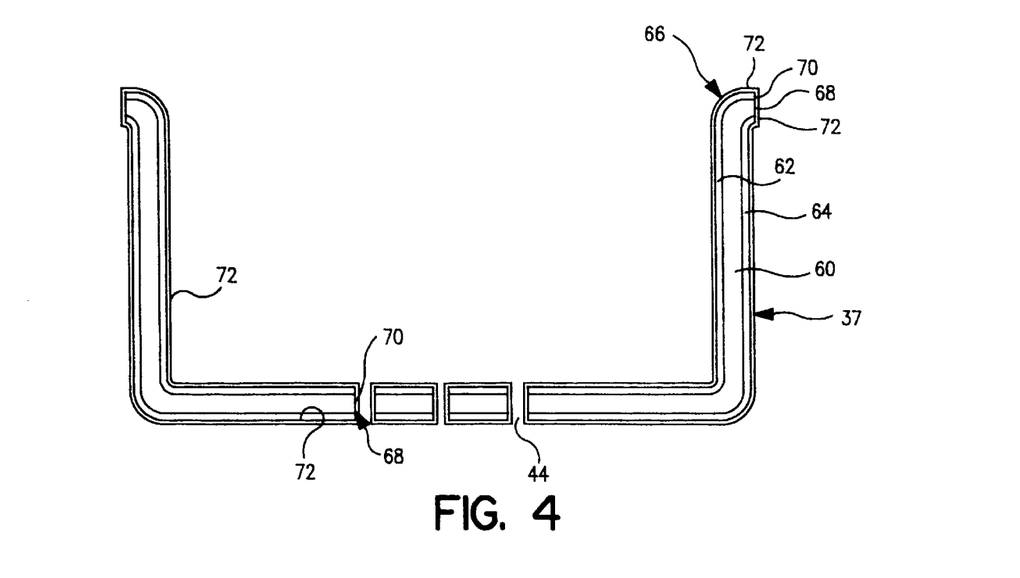
FIG. 4 shows a cross-section of a duplex-plated cathode can of the invention.

Referring now to FIG. 4, the duplex plated cans of the invention illustrated therein substantially solve the several weaknesses associated with use of conventional pre-plated cans and conventional post-plated cans, including the inefficiencies accompanying changeover from pre-plated cans to post-plated cans. Still referring to FIG. 4, there is seen there the usual pre-plated can structure as illustrated in FIGS. 2 and 2A. Namely, steel core layer 60 has the usual thickness associated with the respective can size. Nickel pre-plate layers 62, 64 have the usual thickness associated with the respective pre-plate layers for a respective can size.

For example, as illustrated in FIG. 4, steel layer 60 is 0.00455 inch (0.116 mm) thick. Nickel layers 62, 64 are each 75 microinches (0.002 mm) thick. Thus, up to this point, the dimensions of the can are the same as those of a corresponding pre-plated can of the desired size.

In addition to the conventional and known layers 60, 62, and 64, preferably the entire can is overcoated in the invention, after dimensional fabrication of the can is complete, with a duplex coating layer 72 of nickel or other corrosion-suppressing material.

As illustrated, the preferred duplex coating layer covers the entireties of layers 62 and 64. In addition, duplex coating layer 72 overlies and is in direct contact with, steel layer 60 at steel edge 70 where the steel is otherwise exposed at severed edge 68, as well as at exposed edges of steel layer 60 in air ports 44.

In general, any amount of nickel applied as duplex coating layer 72 provides a measure of benefit toward inhibiting corrosion of the otherwise exposed steel edges. To a degree, the greater the thickness of duplex coating layer 72, the greater the corrosion-inhibiting effect. While lesser benefits are achieved, even coatings less than 20 microinches (0.0005 mm) thick provide some improvement in corrosion resistance in some environments. Layers 72 of 20 microinches (0.0005 mm) up to about 100 microinches (0.0025 mm) thickness are preferred. In this range, the duplex coating layer is generally effective in suppressing corrosion at steel edge 70 and at the steel edges in the air ports. Less than 20 microinches (0.0005 mm) provides limited corrosion protection and so, while being of some useful benefit, is not preferred. At thicknesses greater than 100 microinches (0.0025 mm), processing difficulties may be encountered in assembling cells using such cans without significant change in set-up of the assembly machines.

A benefit of the invention is that the punch and die operation fabricates only pre-plated metal sheet to make pre-plated cans. The resulting pre-plated cans are used as usual to make cells for use in lower humidity environments. Where use in a higher humidity environment is contemplated, the pre-plated cans are duplex-plated as taught herein prior to the cans being used in assembling cells. Accordingly, duplex plated cans of the invention can be produced without any requirement to run unplated sheet material through the punch and die operation.

EXAMPLE

Pre-plated and duplex coated cans of the invention are fabricated as follows. The typical pre-plated metal sheet having layers of Ni/steel/Ni is processed through the can dimensional fabrication (e.g. punch and die) machines to produce conventional pre-plated cans. The so-fabricated pre-plated cans are used as desired to fabricate pre-plated cells for use in low and/or moderate humidity environments. As needed, a suitable duplex coating layer 72 is applied over the entire surfaces of a portion of the pre-plated cans, using a solution plating process. The thickness of the duplex coating can be generally controlled by controlling the amount of time the cans are left in the plating solution.

The thickness of duplex coating layer 72 affects the assembly of the cans into cells to the extent the bottom walls and side walls of the cans are thicker than corresponding pre-plated bottom walls and side walls of cans used for cells of a given size. Namely, any thickness of the duplex coating layer is an anomaly in the cell assembly process. To the extent the thickness of duplex coating layer 72 can be held suitably low, or where thickness of layer 72 can be compensated for, the corresponding anomaly to the cell assembly process is respectively attenuated. Thus, layer 72 should be only as thick as necessary in order to achieve the desired level of corrosion protection which may well allow for some corrosion susceptibility in very harshly corrosive environments.

In the alternative, the anomaly can be somewhat alleviated by somewhat reducing thickness of nickel layers 62, 64 in the metal sheet used for fabricating cans which will be subjected to the post-duplex-coating process.

Thus while it is possible to make the duplex coating layer quite thick, for example up to 500 microinches (0.013 mm) or more, and while such layer can provide excellent corrosion resistance, a balance of a suitable level of corrosion protection, in combination with efficient cell assembly, can be achieved where layer 72 is quite thin by post-plating standards. Thus, a layer as thin as 20 microinches (0.0005 mm) provides an amount of corrosion resistance acceptable for some applications. About 30 microinches (0.0008 mm) is a preferred lower threshold of thickness. About 40 microinches (0.001 mm) to about 100 microinches (0.0025 mm) is a preferred range of thicknesses for layer 72, especially where layer 72 is deposited by electroless plating.

Thicknesses within the recited range, especially for example the lower numbers, such as 35 microinches (0.0009 mm), 45 microinches (0.0011 mm), and 50 microinches (0.0013 mm) are all acceptable thicknesses, as well as all thicknesses between the recited thickness numbers. Greater thicknesses such as, 60 microinches (0.0015 mm), 70 microinches (0.0018 mm), 75 microinches (0.0019 mm). 80 microinches (0.0020 mm), or 90 microinches (0.0023 mm), as well as all thicknesses in between, are also acceptable in some assembly processes.

Suitable duplex electroless nickel plating of dimensionally-fabricated pre-plate cans, as used herein, is available from Technical Plating Inc., Brooklyn Park, Minn.

Thus, given the net thickness addition (over the pre-plate specification) attributed to the duplex coating, and in view of the desire to not change the set-up of the cell assembly production line for manufacture of a short run of cells having a higher level of corrosion resistance, duplex coating layer 72 should be as thin as practical while meeting the corrosion resistance requirements of the use environment. Accordingly, the thickness selected for layer 72 balances competing needs to provide suitable corrosion resistance while maintaining efficiency in cell assembly, whereby the smaller thicknesses in the recited preferred range are favored for use as layer 72. Namely, while greater thicknesses provide better corrosion protection, lesser thicknesses are desirable for maintaining efficient cell assembly.

Layer 72 can be applied by any of the known solution coating processes, including the full family of electroplating processes as well as the full family of electroless plating processes. Given the known characteristics of known electroplating and electroless plating processes, preferred processes for applying duplex coating layer 72 are the electroless plating processes, which provide especially favorable thicknesses of material deposition at the severed edges of steel layer 60, for example at air ports 44 and at the tops of side walls 37.

Having thus provided an enabling disclosure of the invention, and how to make and use the invention, the following discussion illustrates additional benefits typically attributable to the invention. Table 1 illustrates typical comparative characteristics of cells made using conventional pre-plated cans, conventional post-plated cans, and using duplex plated cans of the invention. As seen therein, cells made with duplex plated cans of the invention achieve desirable properties in all the tested categories, whereas cells made with both the pre-plated cans and the post-plated cans are associated with at least one undesirable characteristic.

TABLE 1

| Property Tested | Pre-Plate | Post-Plate | Duplex Plate |
| --- | --- | --- | --- |
| Corrosion Resistance | Poor | Good | Good |
| Dimensional Consistency | Good | Marginal | Good |
| Dimensional Fit of Parts | Good | Restricted | Good |
| Dimensional Dome Control | Good | Limited | Good |

TABLE 1-continued

| Property Tested | Pre-Plate | Post-Plate | Duplex Plate |
| --- | --- | --- | --- |
| Impedance of Cell | Low, consistent | High, inconsistent | Low, consistent |
| Robustness of Assy Process | Good | Limited | Good |
| Leakage at Vent Holes | Good | Erratic | Good |

Additional benefits of duplex-plated cans of the invention are seen as follows. Down time per eight-hour cell assembly shift is less for duplex-plated cans than for post-plated cans. A representative comparison of impedance rejects of cells at assembly is that the impedance reject rate at cell assembly is less for duplex-plated cans than for post-plated cans.

Materials suitable for use as the metal strip from which cans of the invention are dimensionally fabricated include nickel plated steel. The steel layer can be, for example, cold rolled steel, cold rolled mild steel, or stainless steel. Other steels may be used as desired, so long as they exhibit suitable strength in combination with suitable forming capabilities. The nickel layers 62. 64 can be clad, or preferably plated, onto the steel core layer. Plated layers are optionally diffusion bonded to the steel layers. The process of fabricating the metal strip can also include annealing the metal sheet. The metal strip is also preferably compression rolled. Compression rolling work hardens the metal sheet. Compression rolling also imparts to the metal sheet the surface characteristics of the compressing rolls. Thus, the nature of smoothness, uniformity, and like physical properties inherent in the surface of a plated layer are suitably modified in the pre-plated metal sheet in order to develop improved surface properties of the resultant pre-plated metal sheet. Opportunities to implement such mechanical improvements in surface properties are not, in general, available in the post-plating environment after dimensional fabrication of the can, wherein the entirety of the corrosion protection provided over the core layer is applied as a post-plated coating.

By contrast, in the duplex-plating environment of the invention, the majority of the surface area of the can, indeed most of the surface area of the can, is well protected by pre-plated protective metal plating layers 62, 64, with only cut edges 68 being susceptible to corrosion, and cut edges 68 being protected at least in part, preferably well protected, by duplex coating layer 72.

Nickel layers 62, 64 are preferably generally pure nickel. However, combination material compositions containing nickel are also acceptable for pre-plate layers 62, 64, such materials as INCONEL (INCO alloy of nickel, a non-magnetic alloy), and pure nickel with minor alloying elements (NICKEL 200 and related family of NICKEL 200 alloys such as NICKEL 201, etc.), all available from Huntington Alloys, a division of INCO, Huntington, W. Va., USA. Some noble metals can also find use as duplex coating layer 72 such as by plating, cladding etc., including for example, and without limitation, gold, silver, platinum, palladium, and the like.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

To the extent the following claims use means plus function language, it is not meant to include there, or in the instant specification, anything not structurally equivalent to what is shown in the embodiments disclosed in the specification.

Having thus described the invention, what is claimed is:

1. A duplex-coated cathode can for use in an air depolarized electrochemical button cell, said cathode can having a bottom wall, an outer surface including opposing inner and outer major surface elements on said bottom wall, said cathode can comprising:
   (a) a substrate comprising a metal core layer, and protective metal plating layers as coatings on opposing sides of said core layer; and
   (b) a duplex coating layer disposed outwardly of said metal plating layers,
an air port extending through said bottom wall of said cathode can, between the inner and outer major surface elements thereof.

2. A duplex-coated cathode can as in claim 1, said duplex coating layer covering a susceptible portion of the outer surface of said substrate, susceptible to being corroded in a high humidity environment.

3. A duplex-coated cathode can as in claim 1, said core layer having an exposed edge extending to the outer surface of said substrate and being not protectively coated by said protective metal plating layers, said duplex coating layer coating the exposed edge.

4. A duplex-coated cathode can as in claim 1, said duplex coating layer covering a majority of the outer surface of said cathode can.

5. A duplex-coated cathode can as in claim 1 wherein the predominant material in said duplex coating layer is the same as the predominant material in said protective metal plating layers.

6. A duplex-coated cathode can as in claim 1 wherein thickness of said duplex coating layer is less than thicknesses of said protective metal plating layers.

7. A duplex-coated cathode can as in claim 1 wherein thickness of said duplex coating layer is no more than 75% of thickness of said protective metal plating layer.

8. A duplex-coated cathode can as in claim 1, combined thickness of a given said protective metal plating layer and said duplex coating layer being about 75 microinches (0.002 mm) to about 200 microinches (0.005 mm).

9. A duplex-coated cathode can as in claim 1 wherein thickness of said duplex coating layer is about 25 microinches (0.0006 mm) to about 100 microinches (0.0025 mm).

10. A duplex-coated cathode can as in claim 1 wherein a first thickness of a combination of a said protective metal plating layer and said duplex coating layer is at least 1.25 times, up to about 2 times, the average of a second thickness of the respective said protective metal plating layer.

11. A duplex-coated cathode can as in claim 1 wherein said duplex coating layer is a result of an electroless plating process.

12. A duplex-coated cathode can as in claim 1 wherein the predominant material in said protective metal plating layers is nickel.

13. A duplex-coated cathode can as in claim 1 wherein the predominant material in both said protective metal plating layers and said duplex coating layer is nickel, and said core layer is steel.

14. A duplex-coated cathode can as in claim 13 wherein said duplex coating layer is a result of an electroless plating process.

15. A duplex-coated cathode can as in claim 12 wherein said protective plating layers comprise nickel, diffusion bonded to the steel core layer.

16. A duplex-coated cathode can as in claim 1 wherein the predominant material in said duplex coating layer is nickel.

17. A duplex-coated cathode can as in claim 13 wherein the predominant material in said duplex coating layer is nickel.

18. A duplex-coated cathode can as in claim 17 wherein said protective plating layers comprise nickel, diffusion bonded to the steel core layer.

19. A duplex-coated cathode can as in claim 1, said core layer having an exposed edge extending to the outer surface of said substrate, said duplex coating layer being in surface-to-surface contact with, and covering, said core layer at the exposed edge.

20. A duplex-coated cathode can as in claim 16, said core layer having an exposed edge extending to the outer surface of said substrate, said duplex coating layer being in surface-to-surface contact with, and covering, said core layer at the exposed edge.

21. A duplex-coated cathode can as in claim 2, said duplex coating layer covering substantially all of said protective metal plating layer, in addition to covering all of the susceptible portion of the outer surface.

22. A duplex-coated cathode can as in claim 21, having a corrosion susceptibility, during normal use in a high humidity environment, substantially less than the corrosion susceptibility of a like can but without said duplex coating layer.

23. An air depolarized electrochemical button cell comprising (i) an anode including an anode can and electroactive anode material in said anode can; and (ii) a cathode including a duplex-coated cathode can as in claim 1, and a cathode assembly in said cathode can, a separator being disposed between said electroactive anode material and said cathode assembly.

24. An air depolarized electrochemical button cell comprising (i) an anode including an anode can and electroactive anode material in said anode can; and (ii) a cathode including a duplex-coated cathode can as in claim 4, and a cathode assembly in said cathode can, a separator being disposed between said electroactive anode material and said cathode assembly.

25. An air depolarized electrochemical button cell comprising (i) an anode including an anode can and electroactive anode material in said anode can; and (ii) a cathode including a duplex-coated cathode can as in claim 9, and a cathode assembly in said cathode can, a separator being disposed between said electroactive anode material and said cathode assembly.

26. An air depolarized electrochemical button cell comprising (i) an anode including an anode can and electroactive anode material in said anode can; and (ii) a cathode including a duplex-coated cathode can as in claim 16, and a cathode assembly in said cathode can, a separator being disposed between said electroactive anode material and said cathode assembly.

27. An air depolarized electrochemical button cell comprising (i) an anode including an anode can and electroactive anode material in said anode can; and (ii) a cathode including a duplex-coated cathode can as in claim 21, and a cathode assembly in said cathode can, a separator being disposed between said electroactive anode material and said cathode assembly.

28. An air depolarized electrochemical button cell comprising (i) an anode including an anode can and electroactive anode material in said anode can; and (ii) a cathode including a duplex-coated cathode can as in claim 22, and a cathode assembly in said cathode can, a separator being disposed between said electroactive anode material and said cathode assembly.

29. A duplex-coated cathode can for use in an air depolarized electrochemical button cell, said duplex-coated cathode can having a bottom wall and comprising:
  (a) metal sheet material defining an inner major surface and an opposing outer major surface, and an air port extending between the inner major surface and the outer major surface at said bottom wall, for passage of air therethrough, a severed edge portion, and a pre-plated portion defined by protective metal plating layers overlying a core layer, said core layer not being protectively coated by said protective metal plating layers at the severed edge portion of said sheet material; and
  (b) a duplex coating comprising the protective metal plating layers and a duplex coating layer, a first portion of said duplex coating comprising said duplex coating layer, but not said protective metal plating layer, covering the severed edge of the core layer, without intervention of the protective metal plating layer between the duplex coating layer and the core layer at the severed edge, and a second portion wherein the duplex coating, away from the severed edge, comprises said protective metal plating layer between said duplex coating layer and said core layer.

30. A duplex-coated cathode can as in claim 29, average thickness of the duplex coating, away from the severed edge, being at least 1.25 times, and no more than 2 times, average thickness of a respective said protective metal plating layer.

31. A duplex-coated cathode can as in claim 29 wherein average thickness of said duplex coating layer is no more than 75% of average thickness of an underlying said protective metal plating layer.

32. A duplex-coated cathode can as in claim 29 wherein thickness of said duplex coating layer is about 25 microinches (0.0006 mm) to about 100 microinches (0.0025 mm).

33. A duplex-coated cathode can as in claim 29 wherein the predominant material in both said protective metal plating layer and said duplex coating layer is nickel, and said core layer is steel.

34. A duplex-coated cathode can as in claim 29, having a corrosion susceptibility, during normal use in a high humidity environment, substantially less than the corrosion susceptibility of a like can but without said duplex coating layer.

35. An air depolarized electrochemical button cell comprising (i) an anode including an anode can and electroactive anode material in said anode can; and (ii) a cathode including a duplex-coated cathode can as in claim 29, and a cathode assembly in said cathode can, a separator being disposed between said electroactive anode material and said cathode assembly.

36. A duplex-coated cathode can for use in an air depolarized electrochemical button cell, said duplex-coated cathode can having a bottom wall, an outer surface including inner and outer major surface elements on said bottom wall, and an air port extending from the inner major surface to the outer major surface at said bottom wall, for passage of air therethrough, said duplex-coated cathode can comprising:
  (a) a thin-section metal sheet core having opposing major surfaces, and severed edges of said metal sheet core; and
  (b) a corrosion inhibiting duplex coating covering substantially all of the metal sheet core, said duplex coating comprising protective metal plating layers and a duplex coating layer, a portion of said duplex coating layer being in surface-to-surface contact with, and covering, said metal sheet core at the severed edges of said metal sheet core.

37. A duplex-coated cathode can as in claim 36 wherein thickness of said duplex coating layer is less than a thickness of a respective said protective metal plating layer.

38. A duplex-coated cathode can as in claim 36, average thickness of the duplex coating, away from the severed edge, being at least 1.25 times, and no more than 2 times, average thickness of a respective said protective metal plating layer.

39. A duplex-coated cathode can as in claim 36 wherein the predominant material in said duplex coating layer is the same as the predominant material in said protective metal plating layer.

40. A duplex-coated cathode can as in claim 36 wherein said duplex coating layer is a result of an electroless plating process.

41. A duplex-coated cathode can as in claim 36 wherein the predominant material in both said protective metal plating layer and said duplex coating layer is nickel, and said core layer is steel.

42. A duplex-coated cathode can as in claim 36 wherein said protective plating layer is nickel, diffusion bonded to the steel core layer.

43. A duplex-coated cathode can as in claim 36 wherein the predominant material in said duplex coating layer is nickel.

44. A duplex-coated cathode can as in claim 36, having a corrosion susceptibility, during normal use in a high humidity environment, substantially less than the corrosion susceptibility of a like can but without said duplex coating layer.

45. An air depolarized electrochemical button cell comprising (i) an anode including an anode can and electroactive anode material in said anode can; and (ii) a cathode including a duplex-coated cathode can as in claim 36, and a cathode assembly in said cathode can, a separator being disposed between said electroactive anode material and said cathode assembly.

46. An air depolarized electrochemical button cell comprising:
  (a) an anode including an anode can and electroactive anode material in said anode can; and
  (b) a cathode including a cathode can, and a cathode assembly in said cathode can, a separator being disposed between said electroactive anode material and said cathode assembly,
said cathode can being fabricated from pre-plated metal sheet comprising a steel core layer disposed between protective metal plating layers wherein said pre-plated metal sheet, as fabricated into said cathode can, has an unplated area of the core layer, exposed to ambient environment,
said cathode can being post-coated with a duplex coating layer after the cathode can is fabricated, wherein the exposed unplated area of the core layer is post-coated, to thereby make a duplex-coated cathode can having the protective metal coating layers underlying the duplex coating layer on a large portion of the surface of the can and the duplex coating layer but not one of the protective metal coating layers on the exposed unplated area of the core layer.

47. An air depolarized electrochemical button cell as in claim 46, the core layer having an exposed edge extending to the outer surface of the pre-plated metal sheet and being not protectively coated by the protective metal plating layer, the duplex coating layer coating the exposed edge.

48. An air depolarized electrochemical button cell as in claim 46 wherein a first thickness of a combination of a respective said protective metal plating layer and the duplex coating layer is at least 1.25 times, and no more than 2 times, average thickness of the respective protective metal plating layer.

49. An air depolarized electrochemical button cell as in claim 46 wherein thickness of the duplex coating layer is about 25 microinches (0.0006 mm) to about 100 microinches (0.0025 mm).

50. An air depolarized electrochemical button cell as in claim 46 wherein the duplex coating layer is implemented in an electroless solution-coating process.

51. An air depolarized electrochemical button cell as in claim 46 wherein the predominant material in both the protective metal plating layers and the duplex coating layer is nickel.

52. An air depolarized electrochemical button cell as in claim 46, the duplex coating layer being in surface-to-surface contact with, and covering, the core layer at the exposed edge.

53. An air depolarized electrochemical button cell as in claim 46, the duplex coating layer covering substantially all of the protective metal plating layers, in addition to covering all of the unplated area of the core layer.

54. An air depolarized electrochemical button cell as in claim 46, the duplex-coated cathode can having a corrosion susceptibility, during normal use in a high humidity environment, substantially less than the corrosion susceptibility of a like can but without the duplex coating layer.

55. An air depolarized electrochemical button cell comprising:
(a) an anode including an anode can and electroactive anode material in said anode can; and
(b) a cathode including a duplex-coated cathode can, and a cathode assembly in said duplex-coated cathode can, a separator being disposed between said electroactive anode material and said cathode assembly,
said electrochemical cell being a member of a second set of cells wherein cells of a first set comprise cathode cans having metal edges susceptible to corrosion in high humidity environments, and cells of the second set comprise duplex-coated cathode cans wherein the respective metal edges are substantially less susceptible to corrosion in high humidity environments, the first and second sets of electrochemical cells representing sequential sets of product on a cell assembly line wherein
(i) a first population of cathode cans is fabricated from metal sheet having a core layer pre-plated with protective metal plating layers such that the so-fabricated cans have metal edges susceptible to corrosion in high humidity environments,
(ii) a duplex coating layer of protective metal is applied to cathode cans representing a portion of the first population of cathode cans, thereby to create a second population of duplex-coated cans, the duplex coating layer being sufficiently thick to increase the level of corrosion resistance of the duplex-coated cathode cans at the susceptible metal edges to a level above the corrosion resistance extant in otherwise corresponding cathode cans not duplex coated, and sufficiently thin as to accommodate routine assembly of electrochemical cells using duplex-coated cathode cans of the second population, the second population of duplex-coated cathode cans being made according to machine set-up and assembly steps used for making cells incorporating cathode cans of the first population, and
(iii) electrochemical cells are assembled using duplex coated cathode cans of the second population in combination with machine set-up and assembly steps used for making cells incorporating cathode cans of the first population.

56. An air depolarized electrochemical button cell as in claim 55 wherein the electrochemical cells made with the duplex coated cathode cans are tested so as to establish a first population of acceptable cells having elevated levels of corrosion resistance in high humidity environments and a second population of cells having relatively lower levels of corrosion resistance.

57. An air depolarized electrochemical button cell as in claim 55, the duplex coating layer covering a majority of the outer surface of the substrate.

58. An air depolarized electrochemical button cell as in claim 55 wherein thickness of said duplex coating layer is less than thickness of said protective metal plating layer.

59. An air depolarized electrochemical button cell as in claim 55 wherein thickness of the duplex coating layer is no more than 75% of thickness of the protective metal plating layer.

60. An air depolarized electrochemical button cell as in claim 55, combined average thicknesses of pre-plated protective metal plating layers and the duplex coating layer being about 75 microinches (0.002 mm) to about 200 microinches (0.005 mm).

61. An air depolarized electrochemical button cell as in claim 55 wherein thickness of the duplex coating layer is about 25 microinches (0.0006 mm) to about 100 microinches (0.0025 mm).

62. An air depolarized electrochemical button cell as in claim 55 wherein average thickness of a combination of a said protective metal plating layer and the duplex coating layer is at least 1.25 times, and no more than 2 times, average thickness of the respective said protective metal plating layer.

63. An air depolarized electrochemical button cell as in claim 55, the duplex coating layer being the result of an electroless plating process.

64. An air depolarized electrochemical button cell as in claim 55 wherein the predominant material in both the protective metal plating layers and the duplex coating layer is nickel, and the core layer is steel.

65. An air depolarized electrochemical button cell as in claim 55, the duplex coating layer covering substantially all of the protective metal plating layer, in addition to covering all of the metal edges susceptible to corrosion.

66. An air depolarized electrochemical button cell as in claim 65, the second population of cathode cans having corrosion susceptibility, during normal use in a high humidity environment, substantially less than the corrosion susceptibility of otherwise corresponding cathode cans of the first population but without the duplex coating layer.

67. An air depolarized electrochemical button cell as in claim 55 wherein the duplex coating layer is applied to reflect a thickness of no more than 75% of thickness of underlying ones of the protective metal plating layers.

68. An air depolarized electrochemical button cell as in claim 55 wherein the duplex coating layer is applied to reflect a thickness such that combined thickness of the respective protective metal plating layer and the duplex coating layer is about 75 microinches (0.002 mm) to about 200 microinches (0.005 mm).

69. An air depolarized electrochemical button cell as in claim 55 wherein the duplex coating layer is applied to reflect a thickness of about 25 microinches (0.0006 mm) to about 100 microinches (0.0025 mm).

70. An air depolarized electrochemical button cell as in claim 55 wherein the duplex coating layer is applied such that a first thickness of a combination of the protective metal plating layer and the duplex coating layer is at least 1.25 times, and no more than 2 times, a second thickness of a respective said underlying protective metal plating layer.

71. An air depolarized electrochemical button cell as in claim 55 wherein the predominant material in both the protective metal plating layers and the duplex coating layer is nickel, and the core layer is steel.

72. An air depolarized electrochemical button cell as in claim 55 wherein the duplex coating layer is applied using an electroless plating process.

73. An air depolarized electrochemical button cell as in claim 55, the duplex coating layer covering substantially all of the protective metal plating layer, in addition to covering all portions of the core layer.

74. An air depolarized electrochemical button cell as in claim 55, the second population having a corrosion susceptibility, during normal use in a high humidity environment, substantially less than the corrosion susceptibility of the first population.

75. An air depolarized electrochemical button cell made with a duplex-coated cathode can of a second population of duplex-coated cathode cans wherein cathode cans of a first population comprise cathode cans having metal edges susceptible to corrosion in high humidity environments, and cathode cans of the second population comprise duplex-coated cathode cans wherein the respective metal edges are substantially less susceptible to corrosion in high humidity environments, the first and second populations of cathode cans representing sequential populations of product on a cathode can assembly line wherein
  (i) the first population of cathode cans is fabricated according to a first set of dimensional can specifications by performing dimensional metal fabrication steps on a substrate comprising pre-plated metal sheet having a second set of metal sheet specifications, the pre-plated metal sheet comprising a metal core layer between first and second coating layers, the first and second layers defining pre-plated surfaces of the metal sheet, the fabrication of the first population including exposing a portion of the core layer, and thereby fabricating cans having exposed metal edges susceptible to corrosion under high humidity conditions,
  (ii) the second population of cathode cans is fabricated according to a third set of dimensional can specifications by post-applying second relatively thin, and protective, duplex post-coating layers onto cathode cans having the first set of specifications, thus post-coating both the pre-plated surfaces and exposed metal edges of a respective can with a duplex coating layer, the first and second layers being disposed between the core layer and the duplex coating layer, but not at the exposed metal edges, the duplex coating layer thus providing corrosion protection for the core layer at the exposed metal edges, the third set of dimensional can specifications being sufficiently similar to the first set of dimensional can specifications that both the first and second can populations can be run on a common assembly line, and
  (iii) a first set of cells is fabricated using cathode cans having the first set of dimensional specifications, accompanied by a fourth set of down-time ratios and reject rates, and a second set of cells is fabricated using duplex-coated cathode cans having the third set of dimensional specifications, without making substantial changes to set-up of assembly apparatus on the assembly line, accompanied by a fifth set of down-time ratios and reject rates similar to the fourth set of down-time ratios and reject rates.

76. A duplex-coated cathode can for use in an air depolarized electrochemical button cell, said cathode can having an outer surface including opposing inner and outer major surface elements, said cathode can comprising:
  (a) a substrate comprising a metal core layer, and protective metal plating layers as coatings on opposing sides of said core layer; and
  (b) a duplex coating layer disposed outwardly of said metal plating layers, an air port extending through a bottom wall of said cathode can, between the inner and outer major surface elements thereof,
said core layer having an exposed edge extending to the outer surface of said substrate and being not protectively coated by said protective metal plating layers, said duplex coating layer coating the exposed edge.

77. A duplex-coated cathode can as in claim 76, said duplex coating layer covering a susceptible portion of the outer surface of said substrate, susceptible to being corroded in a high humidity environment.

78. A duplex-coated cathode can as in claim 76 wherein thickness of said duplex coating layer is no more than 75% of thickness of said protective metal plating layer.

79. A duplex-coated cathode can as in claim 76, combined thickness of a given said protective metal plating layer and said duplex coating layer being about 75 microinches (0.002 mm) to about 200 microinches (0.005 mm).

80. A duplex-coated cathode can as in claim 76 wherein thickness of said duplex coating layer is about 25 microinches (0.0006 mm) to about 100 microinches (0.0025 mm).

81. A duplex-coated cathode can as in claim 76 wherein a first thickness of a combination of a said protective metal plating layer and said duplex coating layer is at least 1.25 times, up to about 2 times, the average of a second thickness of the respective said protective metal plating layer.

82. A duplex-coated cathode can as in claim 76 wherein the predominant material in both said protective metal plating layers and said duplex coating layer is nickel, and said core layer is steel.

83. A duplex-coated cathode can as in claim 76, said duplex coating layer being in surface-to-surface contact with, and covering, said core layer at the exposed edge.

84. A duplex-coated cathode can as in claim 77, said duplex coating layer covering substantially all of said protective metal plating layer, in addition to covering all of the susceptible portion of the outer surface.

85. A duplex-coated cathode can as in claim 84, having a corrosion susceptibility, during normal use in a high humidity environment, substantially less than the corrosion susceptibility of a like can but without said duplex coating layer.

86. An air depolarized electrochemical button cell comprising (i) an anode including an anode can and electroactive anode material in said anode can; and (ii) a cathode including a duplex-coated cathode can as in claim 76, and a cathode assembly in said cathode can, a separator being disposed between said electroactive anode material and said cathode assembly.

87. An air depolarized electrochemical button cell comprising (i) an anode including an anode can and electroactive anode material in said anode can; and (ii) a cathode including a duplex-coated cathode can as in claim 80, and a cathode assembly in said cathode can, a separator being disposed between said electroactive anode material and said cathode assembly.

88. An air depolarized electrochemical button cell comprising (i) an anode including an anode can and electroactive anode material in said anode can; and (ii) a cathode including a duplex-coated cathode can as in claim 85, and a cathode assembly in said cathode can, a separator being disposed between said electroactive anode material and said cathode assembly.

89. A duplex-coated cathode can as in claim 1, wherein said protective metal plating layers are applied to said metal core layer using cladding as a pre-plating process, and wherein said duplex coating layer is applied outwardly of said metal plating layers using a post-plating process.

90. A duplex-coated cathode can as in claim 29, wherein said duplex coating layer is applied to both said severed edge portion and said pre-plated portion using a post-plating process after dimensional fabrication of the can has been substantially completed.

91. A duplex-coated cathode can as in claim 76, wherein said protective metal plating layers are applied to said metal core layer using cladding as a pre-plating process, and wherein said duplex coating layer is applied outwardly of said metal plating layers using a post-plating process.

* * * * *